United States Patent
Kobayashi et al.

(10) Patent No.: US 8,307,758 B2
(45) Date of Patent: Nov. 13, 2012

(54) CONTINUOUS STIR-FRY COOKING APPARATUS

(75) Inventors: Teruo Kobayashi, Saitama (JP); Eiji Kawase, Saitama (JP)

(73) Assignee: Ajinomoto Co., Inc., Tokyo (JP)

( * ) Notice: Subject to any disclaimer, the term of this patent is extended or adjusted under 35 U.S.C. 154(b) by 330 days.

(21) Appl. No.: 12/732,567

(22) Filed: Mar. 26, 2010

(65) Prior Publication Data

US 2010/0269710 A1 Oct. 28, 2010

(30) Foreign Application Priority Data

Apr. 23, 2009 (JP) ................................. 2009-104950

(51) Int. Cl.
- A23L 1/00 (2006.01)
- A23L 3/00 (2006.01)
- A23N 12/00 (2006.01)

(52) U.S. Cl. ............. 99/348; 99/334; 366/144; 426/523

(58) Field of Classification Search ............ 99/325–335, 99/348, 357, 352–355, 403–410, 468, 483; 366/144–149, 194–196, 318–324; 126/391.1; 426/519, 520, 523, 438

See application file for complete search history.

(56) References Cited

U.S. PATENT DOCUMENTS

| | | | | |
|---|---|---|---|---|
| 2,934,001 A * | 4/1960 | Cunningham et al. | ......... | 99/406 |
| 3,722,401 A * | 3/1973 | Davidson et al. | ............... | 99/407 |
| 4,366,749 A * | 1/1983 | Caridis et al. | ................... | 99/339 |
| 4,860,461 A * | 8/1989 | Tamaki et al. | .................... | 34/68 |
| 4,956,189 A * | 9/1990 | Johnson | ........................ | 426/233 |
| 5,066,505 A * | 11/1991 | Vos et al. | ....................... | 426/438 |
| 5,271,163 A * | 12/1993 | Pikus et al. | ..................... | 34/499 |
| 5,664,482 A * | 9/1997 | Graham et al. | ................. | 99/330 |
| 6,263,785 B1 * | 7/2001 | Zittel | .............................. | 99/348 |
| 7,721,463 B2 * | 5/2010 | Leon | ................................ | 34/321 |
| 2004/0055474 A1 * | 3/2004 | Lekic et al. | ..................... | 99/330 |

FOREIGN PATENT DOCUMENTS

JP 2002-209754 A1 7/2002

* cited by examiner

*Primary Examiner* — Nini Legesse
(74) *Attorney, Agent, or Firm* — Kratz, Quintos & Hanson, LLP

(57) ABSTRACT

A continuous stir-fry cooking apparatus of a rotating drum type includes a heating drum having a cooking ingredient charging portion at one end and a product discharging portion at the other end, a swing arm 23 swingable about a swing shaft provided on an axis line of the heating drum 14, a rotating shaft 24 provided to a swing end of the swing arm to be parallel to the axis line of the heating drum, and a stirring blade member 26 provided to the rotating shaft with a tip end coming in close proximity to an inner peripheral surface of the heating drum. The stirring position of the stirring blade member can be optimized by regulating the swing angle of the swing arm according to the conditions, such as the rotating velocity of the heating drum.

1 Claim, 3 Drawing Sheets

CONTINUOUS STIR-FRY COOKING APPARATUS

TECHNICAL FIELD

The present invention relates to a continuous stir-fry cooking apparatus, and more particularly, to a continuous stir-fry cooking apparatus that continuously cooks fried rice, pilaf, and so forth.

BACKGROUND ART

As an apparatus that cooks a large volume of fried rice or pilaf by stir-frying steamed rice mixed with other ingredients and seasonings, there has been known a continuous stir-fry cooking apparatus of a rotating drum type. This continuous stir-fry cooking apparatus includes a heating drum provided in a rotatable manner with the center axis of the cylindrical body being oriented in a horizontal direction, a steamed rice and cooking ingredient charging portion provided at one end of the heating drum, a product discharging portion provided at the other end of the heating drum, a drum heating means provided on the outer periphery of the heating drum, and a stirring blade that rotates about an axis line different from the center axis line of the heating drum with the tip end coming in close proximity to the inner peripheral surface of the heating drum (for example, refer to Patent Document 1).
[Prior Art Document]
[Patent Document]
  [Patent Document 1] JP-A-2002-209754

SUMMARY OF THE INVENTION

Problems that the Invention is to Solve

However, because the position of the stirring blade is fixed in the continuous stir-fry cooking apparatus of a rotating drum type structured as above, ingredients are not stirred sufficiently in some cases depending on conditions, such as the kinds and amounts of ingredients to be stir-fried and heating temperatures.

In order to overcome such an inconvenience, the invention has an object to provide a continuous stir-fry cooking apparatus capable of stirring ingredients being stir-fried within the heating drum more effectively.

Means for Solving the Problems

In order to achieve the object, a continuous stir-fry cooking apparatus of a rotating drum type according to the invention includes: a heating drum provided in a rotatable manner with a center axis of a cylindrical body being oriented in a horizontal direction and having a cooking ingredient charging portion at one end and a product discharging portion at the other end; a swing arm swingable about a swing shaft provided on an axis line of the heating drum; a rotating shaft provided to a swing end of the swing arm to be parallel to the axis line of the heating drum; and a stirring blade member provided to the rotating shaft with a tip end coming in close proximity to an inner peripheral surface of the heating drum.

Advantage of the Invention

According to the continuous stir-fry cooking apparatus of the invention, by rotating the stirring blade member via the rotating shaft while the swing arm has been swung to an angle that best suits the conditions of the stir-frying operation, the stirring position of the stirring blade member can be optimized within the heating drum. It thus becomes possible to effectively stir ingredients being stir-fried within the heating drum.

In addition, by rotating the stirring blade member while the swing arm is kept swung back and forth like a pendulum, it becomes possible to stir ingredients efficiently regardless of where the ingredients are present within the drum. The continuous stir-fry cooking apparatus thus becomes capable of stir-frying vegetables, meats, and fish and seafood as well as cooking minced scrambled eggs when beaten eggs are charged therein.

MODE FOR CARRYING OUT THE INVENTION

Figure 1:
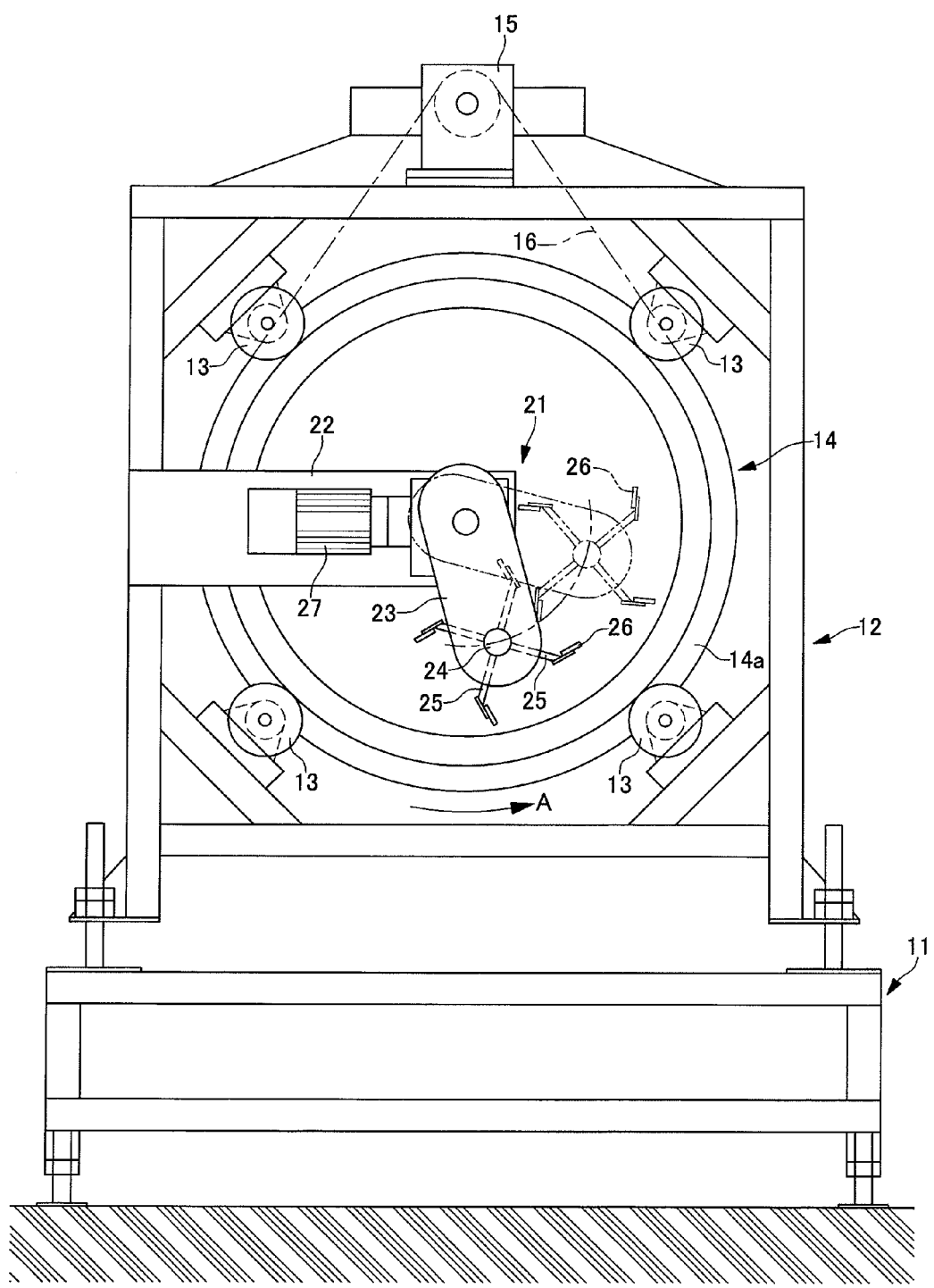
FIG. 1 is a side view showing one embodiment of a continuous stir-fry cooking apparatus of the invention.
Figure 2:
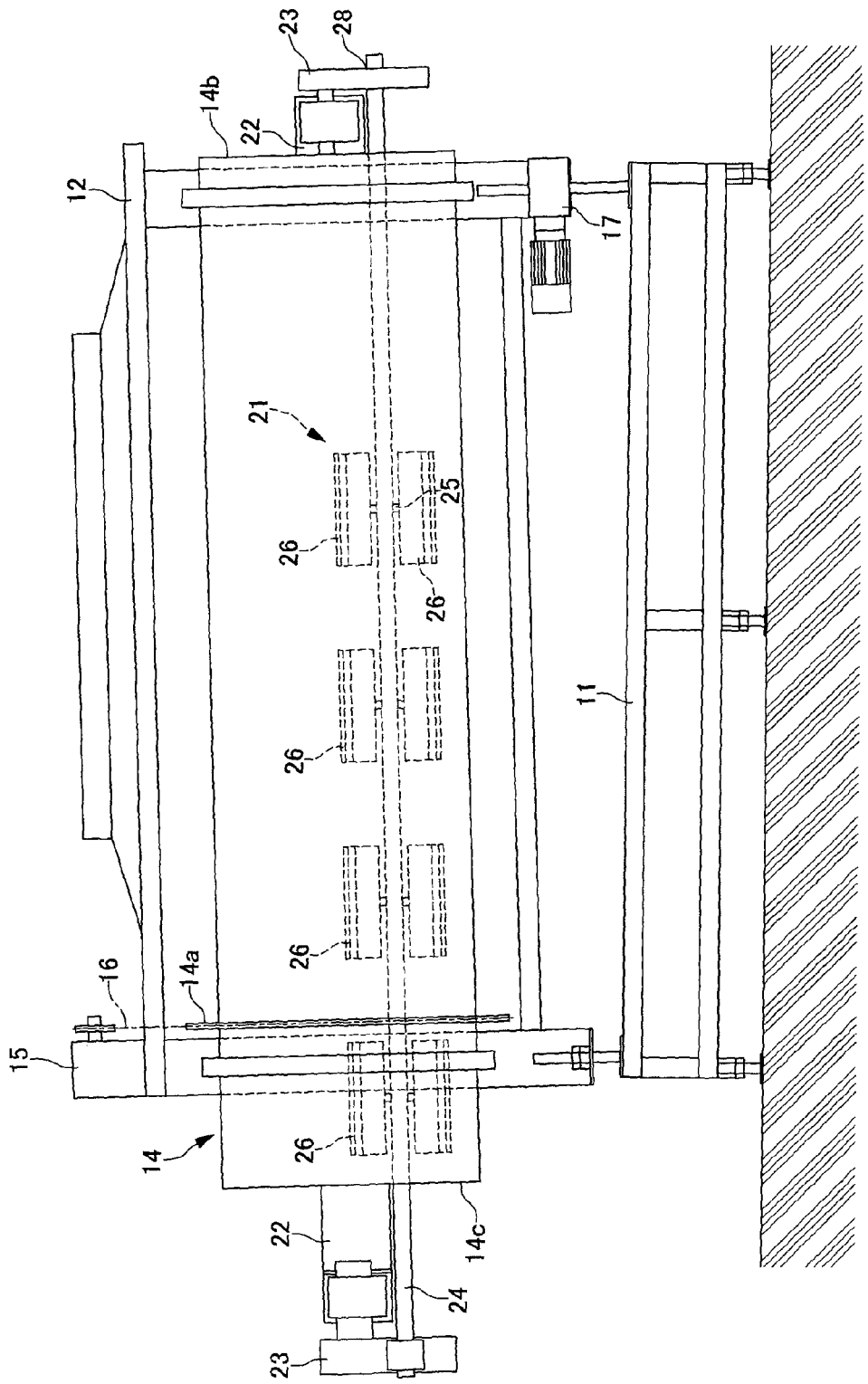
FIG. 2 is a front view of the continuous stir-fry cooking apparatus.
Figure 3:
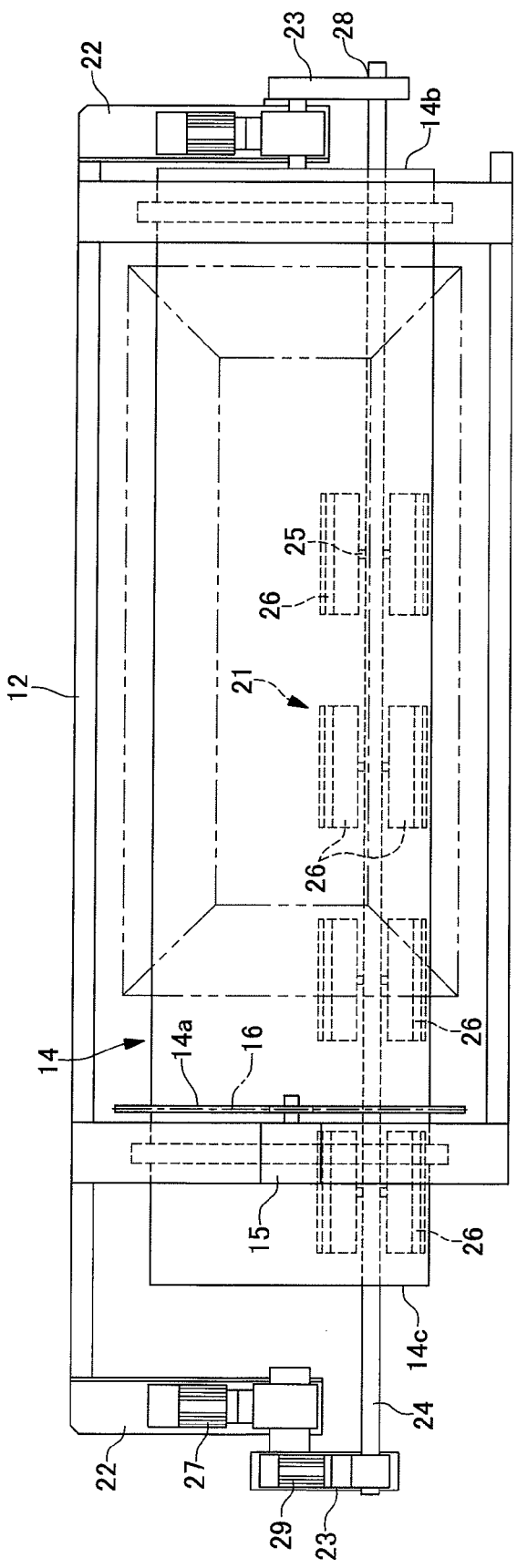
FIG. 3 is a plan view of the continuous stir-fry cooking apparatus.

A continuous stir-fry cooking apparatus according to one embodiment of the invention includes a stand 11, a frame 12 provided onto the stand 11 in a tiltable manner, a heating drum 14 supported on the frame 12 in a rotatable manner via a plurality of rollers 13 with the center axis being oriented in a horizontal direction, and a drum drive motor 15 used to rotate the heating drum 14 and connected to a sprocket portion 14a provided on the outer peripheral surface of the heating drum 14 via a chain 16. Arrow A in FIG. 1 shows the rotating direction of the heating drum 14. Also, heating sources (not shown), such as a heater and a coil, are disposed on the outer periphery of the heating drum 14 for heating the heating drum 14 to a predetermined temperature. Further, a cooking ingredient charging portion 14b is provided at one end of the heating drum 14 and a product discharging portion 14c through which to discharge stir-fried products is provided at the other end. The frame 12 is supported on the stand 11 via a jack 17 on the cooking ingredient charging portion side, so that the cooking ingredient charging portion side of the frame 12 can be lifted up by the jack 17.

A stirring blade 21 that stirs ingredients being stir-fried is provided inside the heating drum 14. The stirring blade 21 includes a pair of supporting members 22 and 22 provided so as to protrude from the frame 12 to the both open end portions of the heating drum 14, a pair of swing arms 23 and 23 provided to tip ends of the respective supporting members 22 and 22 in a swingable manner, a rotating shaft 24 provided to the swing ends of the both swing arms 23 and 23 in a rotatable manner, a plurality of arms 25 provided so as to protrude from the rotating shaft 24, and stirring blade members 26 provided to the tip ends of the respective arms 25.

Each swing arm 23 swings about the axis line of the heating drum 14 as the swing center and is formed in a swingable manner within an angular range pre-set by an orthogonal axis gear motor 27, for example, it is formed to be swingable by up to 90 degrees in the drum rotating direction from below in the vertical direction. The rotating shaft 24 is a rod-like material longer than the length of the heating drum 14 in the axis line direction disposed parallel to the axis line of the heating drum 14. The end of the rotating shaft 24 on the cooking ingredient charging portion side is supported in a rotatable manner on a bearing portion 28 provided to the swing arm 23 on the cooking ingredient charging portion side. The end of the rotating shaft 24 on the product discharging portion side is supported on the drive portion of an orthogonal axis gear motor 29 provided to the swing arm 23 on the product discharging portion side. The rotating shaft 24 is therefore rotated by the orthogonal axis gear motor 29 in a rotating direction same as the rotating direction of the heating drum 14.

Each blade member 26 is provided in a state where the tip end comes in close proximity to the inner peripheral surface of the heating drum 14 with an interval of about 0 to 50 mm. The blade member 26 is provided in a state where the tip end side inclines frontward in the rotating direction with respect to the base end side. The blade member 26 is formed in such a manner that, in association with the swings of the swing arms 23, the tip end of the blade member 26 passes by a position in close proximity to the inner peripheral surface of the heating drum 14 within a range from the position at which the blade member 26 stirs a region in the vicinity of the lower end of the heating drum 14 to the position at which the blade member 26 stirs a region at or about 90 degrees to the drum rotating direction.

The continuous stir-fry cooking apparatus configured as above is capable of stirring ingredients being stir-fried within the heating drum 14 effectively by regulating the swing angle of the swing arms 23 according the conditions, such as the rotating velocity of the heating drum 14 during the stir-frying operation, amounts of cooking ingredients charged into the heating drum 14, a stir-frying time, and a stir-frying temperature.

For example, under the conditions that the rotating velocity of the heating drum 14 is low and the ingredients remain on the lower side of the heating drum 14, it becomes possible to stir the ingredients remaining on the lower side of the heating drum 14 with the blade members 26 by regulating the swing angle so that the swing arms 23 is swung downward in the vertical direction. On the contrary, under the conditions that the rotating velocity of the heating drum 14 is high and the ingredients remain on the upper side of the heating drum 14 in the drum rotating direction, for example, when a major portion of the ingredients remain in a region at 45 degrees in the drum rotating direction with respect to the vertical line passing the axis line, by swinging the swing arms 23 up by 45 degrees in the drum rotating direction from below in the vertical direction, it becomes possible to stir the ingredients remaining on the upper side of the heating drum 14 in the drum rotating direction with the blade members 26.

It should be appreciated that the shape and size, a rotating radius about the rotating shaft 24, and a disposed state of the blade members 26 can be set as needed according to the minor diameter and the length of the heating drum 14, conditions of the stir-frying operation, and so forth. In addition, the swingable range of the swing arms 23 can be set as needed according to various conditions. Moreover, the swing arms 23 can be swung during the stir-frying operation.

DESCRIPTION OF REFERENCE NUMERALS AND SIGNS

11 . . . stand, 12 . . . frame, 13 . . . roller, 14 . . . heating drum, 14*a* . . . sprocket portion, 14*b* . . . cooking ingredient charging portion, 14*c* . . . product discharging portion, 15 . . . drum driving motor, 16 . . . chain, 17 . . . jack, 21 . . . stirring blade, 22 . . . supporting member, 23 . . . swing arm, 24 . . . rotating shaft, 25 . . . arm, 26 . . . stirring blade member, 27 . . . orthogonal axis gear motor, 28 . . . bearing portion, 29 . . . orthogonal axis gear motor

The invention claimed is:

1. A continuous stir-fry cooking apparatus of a rotating drum type, comprising:
   a heating drum provided in a rotatable manner with a center axis of a cylindrical body being oriented in a horizontal direction and having a cooking ingredient charging portion at one end and a product discharging portion at the other end;
   a swing arm swingable about a swing shaft provided on an axis line of the heating drum, wherein the swing arm has a first end at the swing shaft and a second end spaced apart from the swing shaft;
   a rotating shaft provided to the second end of the swing arm to be parallel to the axis line of the heating drum; and
   a stirring blade member provided to the rotating shaft with a tip end coming in close proximity to an inner peripheral surface of the heating drum.

\* \* \* \* \*